United States Patent
Shah et al.

(10) Patent No.: US 6,810,418 B1
(45) Date of Patent: Oct. 26, 2004

(54) METHOD AND DEVICE FOR ACCESSING SERVICE AGENTS ON NON-SUBNET MANAGER HOSTS IN AN INFINIBAND SUBNET

(75) Inventors: Rajesh R. Shah, Portland, OR (US); Ramakrishna V. Saripalli, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 543 days.

(21) Appl. No.: 09/605,362

(22) Filed: Jun. 29, 2000

(51) Int. Cl.[7] .................................. G06F 15/173
(52) U.S. Cl. ................... 709/223; 709/202; 709/250
(58) Field of Search ............................. 370/236, 392; 707/103 R; 709/202, 225, 223, 224, 249, 250

(56) References Cited

U.S. PATENT DOCUMENTS

| | | | | |
|---|---|---|---|---|
| 6,049,819 A | * | 4/2000 | Buckle et al. ............... | 709/202 |
| 6,415,323 B1 | * | 7/2002 | McCanne et al. ............ | 709/225 |
| 6,438,130 B1 | * | 8/2002 | Kagan et al. ................ | 370/392 |
| 6,442,564 B1 | * | 8/2002 | Frey et al. ................. | 707/103 R |
| 6,459,698 B1 | * | 10/2002 | Acharya ..................... | 370/392 |
| 6,549,516 B1 | * | 4/2003 | Albert et al. ................ | 370/236 |

* cited by examiner

Primary Examiner—Zarni Maung
(74) Attorney, Agent, or Firm—Libby H. Hope (57) ABSTRACT

Methods and apparatus for accessing service agents on non-subnet manager hosts in an Infiniband subnet. A service agent at a first host registers with a first General Service Agent (GSA) at the first host. The registration is sent to a second GSA at a second host if the first host is not a subnet manager. The second host is a subnet manager. The second host sends a request for access/identification information to the service agent. The requested access/identification information is received at the second host. A service request is received at the second host for the service agent at the first host. The service request is from a client on the Infiniband subnet. The client is redirected to the first host by the second host sending the client a message. The service request for the service agent is sent to the first host by the client. The first host, second host, and client are part of an Infiniband subnet.

30 Claims, 6 Drawing Sheets

METHOD AND DEVICE FOR ACCESSING SERVICE AGENTS ON NON-SUBNET MANAGER HOSTS IN AN INFINIBAND SUBNET

BACKGROUND

1. Field

This invention relates to Infiniband architecture subnets, and more specifically to accessing service agents on non-subnet manager hosts in an Infiniband subnet.

2. Background

The Infiniband architecture defines a system area network (SAN) for connecting multiple independent processor platforms (i.e., host processor nodes), I/O platforms, and I/O devices in a cluster across a switched communications fabric that allows many devices to concurrently communicate, and allows for higher performance and better reliability, accessibility and serviceability (RAS) characteristics. A cluster consists of one or more subnets interconnected by routers.

Figure 1:
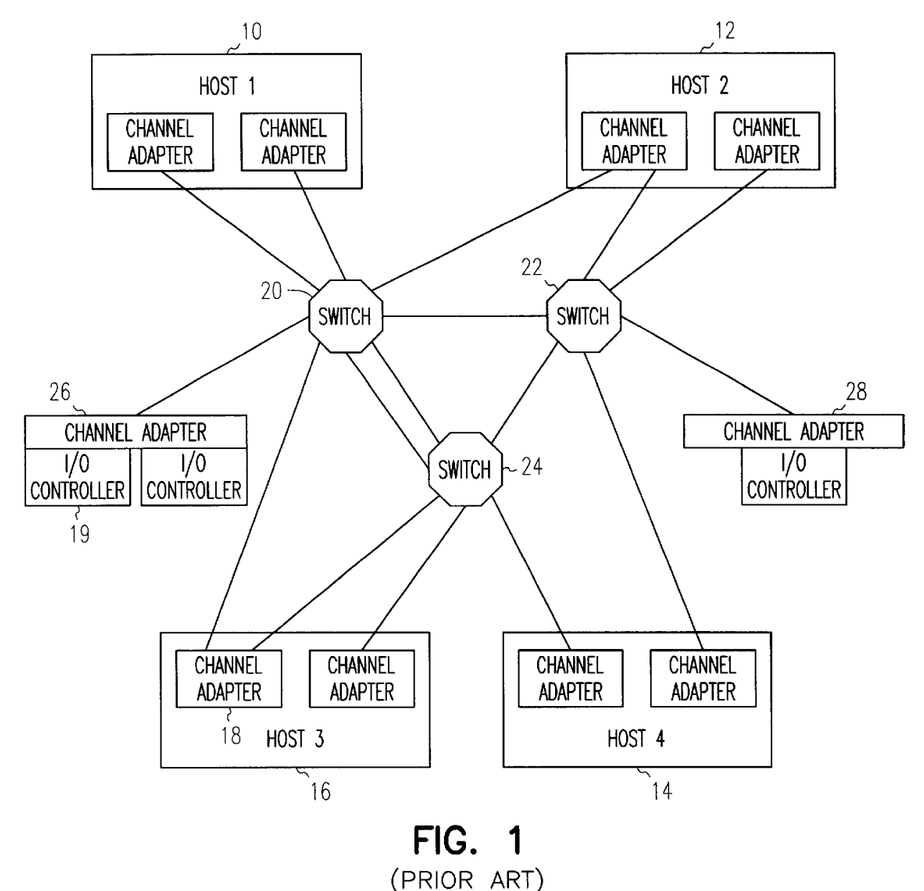
FIG. 1 is a system diagram of an example Infiniband cluster of a single subnet.

FIG. 1 shows an example Infiniband cluster of a single subnet. This subnet consists of four hosts, 10, 12, 14 and 16. These hosts are interconnected via switches 20, 22 and 24. The hosts may also be connected to I/O enclosures 26 and 28 via switches 20, 22 and 24. Hosts and I/O devices are connected to the switches via one or more channel adapters 18.

A subnet is a collection of systems, I/O enclosures, and switches which are managed by a single management entity called a subnet manager. An Infiniband compliant subnet requires at least one subnet manager. The subnet manager may reside at a host, switch, or I/O enclosure. The subnet manager discovers fabric topology, assigns unique addresses to all channel adapter ports that are connected to the fabric, programs switch forwarding tables, and prepares all fabric connected agents so that they can communicate with other fabric agents. Apart from basic initialization services, the subnet requires other services to be present for it to be functional, e.g., a path service that provides information about how to reach fabric attached agents; a device management service that enumerates I/O controllers; a device configuration service that assigns I/O controllers to host; a baseboard management service that allows management of devices beyond a channel adapter; and in addition, particular implementations may need vendor specific services implemented in the subnet.

Services are implemented by logically independent entities called service agents (SA). Service agents are invoked as needed by clients running on subnet hosts. To request a service from a service agent, a client needs to find out the subnet address at which it should direct the service request, and a client needs to find out the queue pair (QP) at which to send the service request. The Infiniband architecture does not define subnet addresses that provide specific services. The only address known to all clients is the address at which the subnet manager resides. When the subnet manager initializes a channel adapter, it registers the subnet manager address with the channel adapter. In order to distribute the load, it is desirable that different service agents be allowed to run on different hosts using different QPs.

The fundamental problem with installing service agents on a host other than the subnet manager is that the only universally known address by clients on the subnet is the address of the subnet manager. Therefore, all service requests need to be directed to the QP on the subnet manager. If a service agent is installed on a host other than the subnet manager, there is no way for the service agent to notify potential clients of its presence. The Infiniband architecture specification has no defined mechanism by which a service agent running on any arbitrary host can register with the General Services Agent (GSA) at the universally known subnet manager address. In the absence of this mechanism, there are two possibilities for implementing service agents on non-subnet manager hosts.

First, install all service agents on the subnet manager host. Since this address is universally known, all clients can issue requests to it. However, this is not efficient since the subnet manager may become a bottle neck if a large number of clients are trying to access the services of a large number of service agents, all of which are implemented on the same host.

Second, install a real service agent on any arbitrary host and install a separate stub service agent on the subnet manager host. The stub service agent on the subnet manager host discovers the real service agent using a proprietary mechanism. When a client issues a service request to the QP on the subnet manager, this stub service agent can redirect the client to the real service agent on another host. This is also inefficient since all services need to have separate stub service agents and real services agents. In addition, each stub service agent may have to implement proprietary mechanisms to locate and communicate with the real service agent.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" suggests that a particular feature, structure, or characteristic described in connection with the embodiment is included in at least one embodiment of the invention. The appearances of the phrase "in one embodiment" in various places in the specification are not necessarily all referring to the same embodiment.

The Infiniband architecture defines the concept of a well known QP called the General Services Interface (GSI) QP. GSI QP is numbered QP1 on all ports on all channel adapters. Clients requesting a service can issue the request to the well known GSI QP on the subnet manager host. The agent that handles all messages on the GSI QP is called the General Services Agent (GSA). Since the GSI OP exists on all channel adapter ports, the GSA also exists on all ports. A service agent on a particular host that provides a specific service, registers itself with the GSA running on that host. As part of this registration, it provides its service class ID to the GSA. When a message comes in on the GSI QP, the GSA inspects the service class ID of the request. If a service agent has registered itself with the GSA for that service class ID, the request is forwarded to the appropriate service agent. If no service agent has registered for that service class ID, the request may be discarded.

The Infiniband architecture specification defines a redirection mechanism that allows a service request to be redirected to a different address and QP. This is done using the ClassPortInfo Management Datagram (MAD). Each service agent is required to support a Get(ClassPortInfo) MAD that provides access/identification information needed to communicate with the service agent. A client that wants to issue a service request can first issue a Get(ClassPortInfo) for the service class it needs. If the service agent wants to redirect a request to a different address in QP, it can respond to this request with a ClassPortInfo message that contains all the needed information.

According to the present invention, service agents may be installed on non-subnet manager hosts and accessed by clients desiring their services. There is no need to install a stub service agent on the subnet manager. This allows a cluster (or system) administrator to balance the load across different cluster hosts, and avoids the problem of the subnet manager being a bottleneck if a large number of clients are actively using a large number of service agents. According to the present invention, a GSA on a non-subnet manager host will automatically report a service agent registration (of a service agent on the non-subnet manager host, i.e., remote service agent) to the GSA on the subnet manager. The GSA on the subnet manager host is responsible for getting all relevant information about the remote service agent so that it may automatically redirect a service request for the remote service agent from a client to the remote service agent. The present invention requires no changes to service agents or clients, and is completely transparent to the them. The GSA on all hosts is the same, and includes the processing to support client access to service agents on non-subnet manager hosts.

Figure 2:
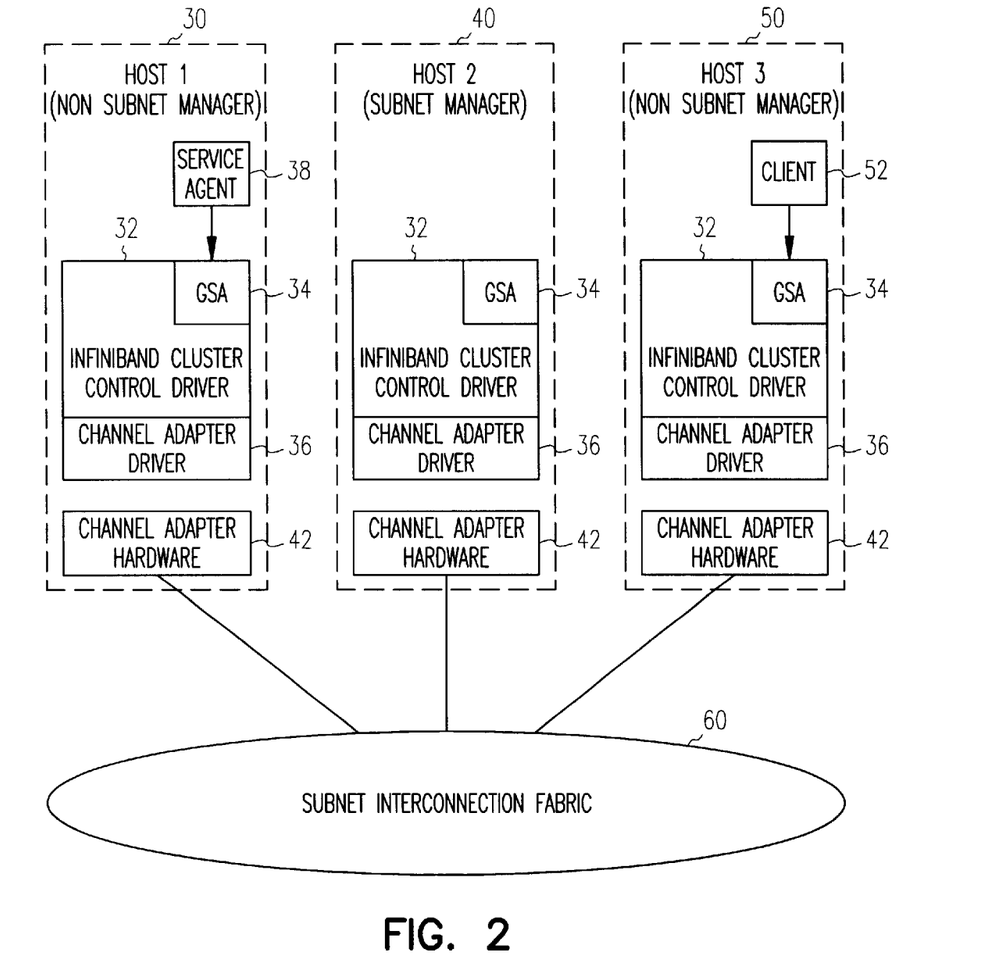
FIG. 2 is a system diagram of an example Infiniband software architecture running on hosts in a subnet according to an example embodiment of the present invention.

FIG. 2 shows a system diagram of an example Infiniband software architecture running on hosts in a subnet according to an example embodiment of the present invention. Host 1, 30, Host 2, 40, and Host 3, 50 are interconnected via subnet interconnection fabric 60. Host 1, 30 and Host 3, 50 are non-subnet manager hosts. Host 2, 40 is the subnet manager. Host 1, 30, Host 2, 40, and Host 3, 50 all may have software modules installed on them that may include: an Infiniband cluster control driver 32, one or more channel adapter drivers 36, and one or more channel adapter hardware 42. Further, each host has a GSA module 34. All hosts have the same GSA 34. Host 1, 30, further has a service agent 38 that interfaces with the GSA on Host 1, 30. Host 3, 50, also includes a client 52 that interfaces with the GSA on Host 3, 50.

The channel adapter hardware provides physical cluster connectivity and is managed by a channel adapter driver specific to the hardware. On top of this is the Infiniband cluster driver that provides uniform access to all channel adapters in the host. The GSA is shown included in the Infiniband control driver in this example. The Infiniband control driver (and the GSA) is not specific to the channel adapter hardware and the same driver runs on al hosts in the subnet. For simplicity, only three hosts in the subnet are shown; however, additional hosts that may include one or more clients and/or one or more service agents may exist and this system will still be within the spirit and scope of the present invention.

Host 2, 40, is the subnet manager. Host 1, 30, may contain a service agent 38 that provides a specific service. Service agent 38 registers itself with the GSA on that host (i.e., Host 1) using a programming interface that is exported by the GSA. Host 3, 50, includes a client 52 that may desire to use the services of service agent 38 on Host 1, 30. Client 52 on Host 3, 50, does not initially know the address of service agent 38 on Host 1, 30, (and vice versa). Host 1 and Host 3 both know the address of the subnet manager, Host 2, 40.

Figure 3:
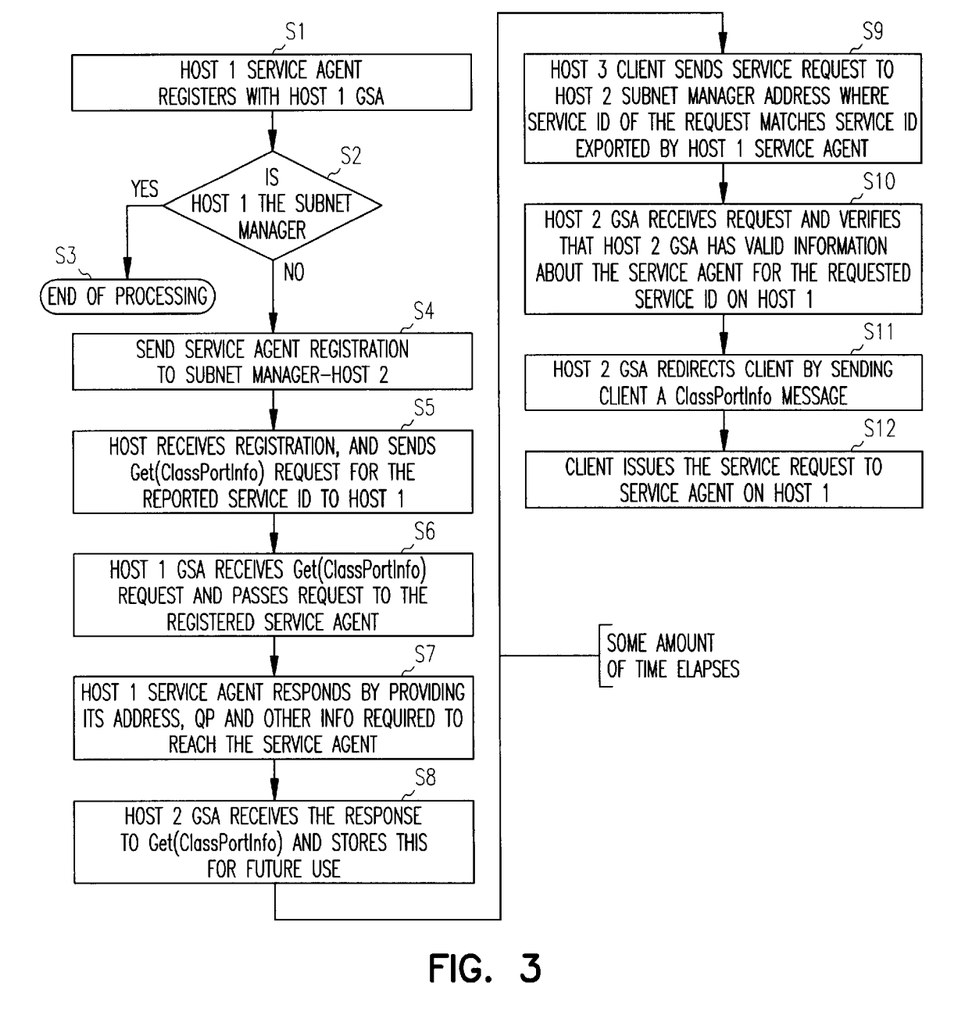
FIG. 3 is a flowchart of an example process for accessing service agents on non-subnet manager hosts according to an example embodiment of the present invention.

FIG. 3 shows a flowchart of an example process for accessing service agents on non-subnet manager hosts according to an example embodiment of the present invention. The service agent at host 1 registers with the GSA at host 1 S1. This is standard behavior and is required of all service agents. A determination is made whether the GSA is at a subnet manager host S2. If the GSA resides at the subnet manager host (i.e., host 1 is the subnet manager), no further processing is required since all clients desiring the services of this service agent know the address of the subnet manager S3. If the GSA at host 1 realizes that the GSA is not running on the subnet manager host, the GSA sends a service agent registration report to the GSA on the subnet manager host (host 2) S4.

The GSA at the subnet manager (host 2) receives the service agent registration report from the GSA at host 1, and sends a Get(ClassPortInfo) request for the reported service class ID to host 1, S5. The GSA at host 1 receives the Get(ClassPortInfo) request from the GSA at subnet manager host 2, and passes this request to the registered service agent at host 1, S6. The service agent at host 1 responds to the Get(ClassPortInfo) request by providing access/ identification information that may include its address, QP, and other information that may be required for clients and others to reach the service agent S7. This is standard behavior for a service agent that is required by the Infiniband architecture specification. The GSA at subnet manager host 2 receives the response to the Get(ClassPortInfo), and may store this response for potential future use S8. Now the GSA at the subnet manager has what it needs to reroute any client service request that it receives for the service agent at host 1.

A client on host 3 sends a service request to the subnet manager, host 2, address S9. The service class ID of the request matches the service class ID exported by the service agent on host 1 with the response to the Get(ClassPortInfo). The GSA on the subnet manager, host 2, receives the service request, and verifies that it has valid information about the service agent for the requested service class ID on host 1, S10. This verification may be accomplished in several ways. The GSA on the subnet manager host may send periodic Get(ClassPortInfo) messages to the remote service agent to make sure the service agent is still alive and active, or the GSA on the subnet manager may send such a request only when it receives a service request from some client.

The GSA on the subnet manager redirects the client by sending the client a ClassPortInfo message S11. This message contains all the information needed for the client to be able to communicate with the service agent on host 1. The Infiniband architecture specification requires that all clients should be able to handle the case in which a service request comes back with a ClassPortInfo redirection response. The client then issues the service request to the service agent on host 1, S12. The client may choose to store the ClassPortInfo information so that it may subsequently issue more requests to that service agent in the future.

Therefore, according to the present invention, no change is required to the service agent or to the client that wants to issue a service request. By assigning additional responsibilities to the GSA, a standard service agent may be installed anywhere on the subnet and can be made visible to its potential clients that may reside anywhere on the subnet.

Figure 4:
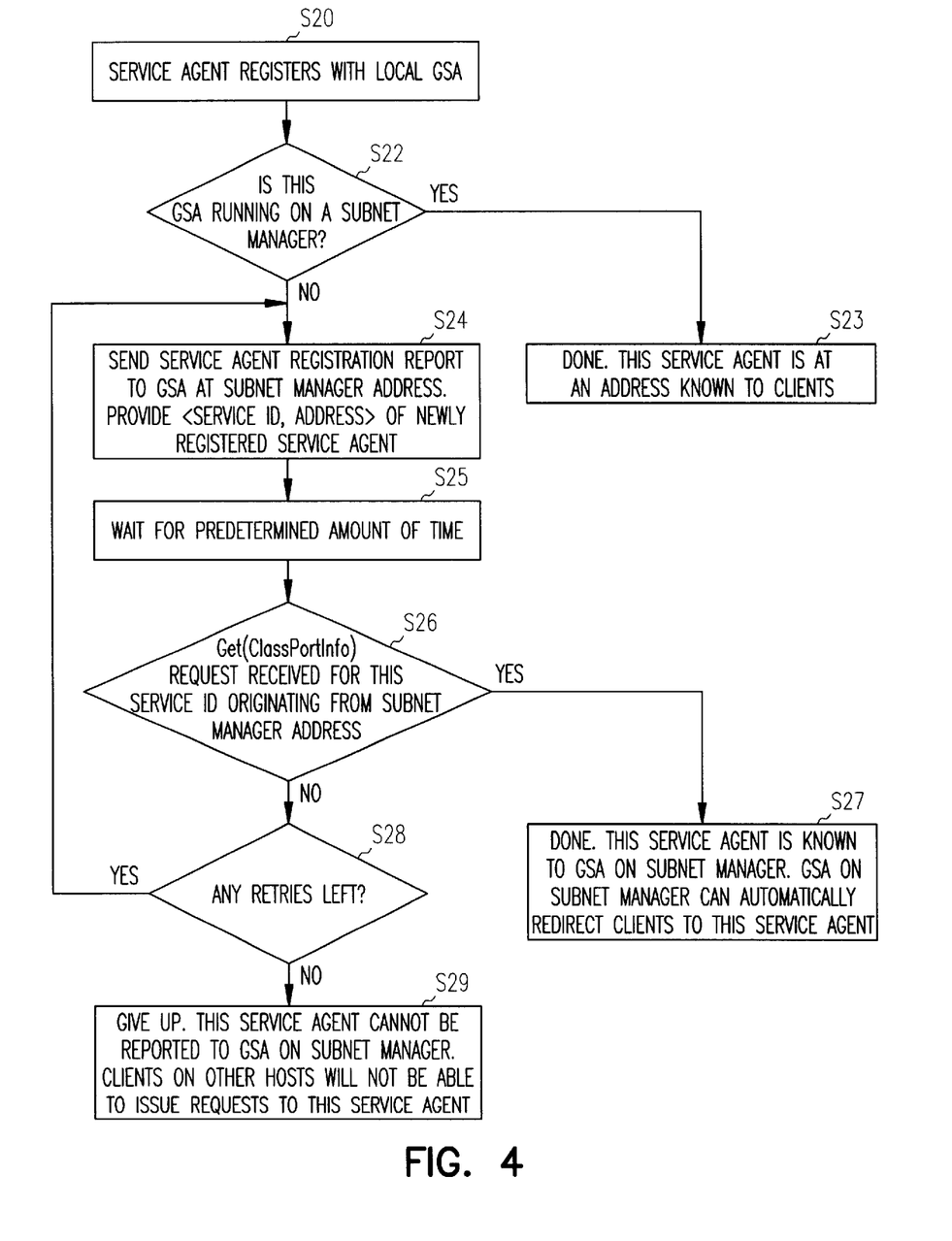
FIG. 4 is a flowchart of an example process that executes on a GSA when a service agent registers with the GSA according to an example embodiment of the present invention.

FIG. 4 shows a flowchart of an example process that executes on a GSA when a service agent registers with the GSA according to an example embodiment of the present invention. The service agent registers with the local GSA, S20. It is determined whether this GSA is running on a subnet manager S22. If this GSA is running on a subnet manager, processing is completed since the service agent is at an address known to all clients S23. Therefore, no further actions are required. If this GSA is not running on a subnet manager, then the service agent registration report is sent to the GSA at the subnet manager address S24. The subnet manager GSA is provided with the service class ID and address of the newly registered service agent. An amount of time then elapses (which may be predetermined) S25. It is determined whether a Get(ClassPortInfo) request has been received for this service class ID originating from the subnet manager address S26. If the service class ID has been received, then processing is complete S27. This service agent is now known to the GSA at the subnet manager. The GSA on the subnet manager can automatically redirect clients to this service agent. However, if the service class ID has not been received, a determination is made as to whether there are any retries left S28. If there are retries left, processes S24, S25 and S26 may be repeated. If there are no retries left, the GSA gives up S29. This service agent, therefore, cannot be reported to the GSA at the subnet manager. Clients on other hosts will not be able to issue requests to this service agent.

Figure 5:
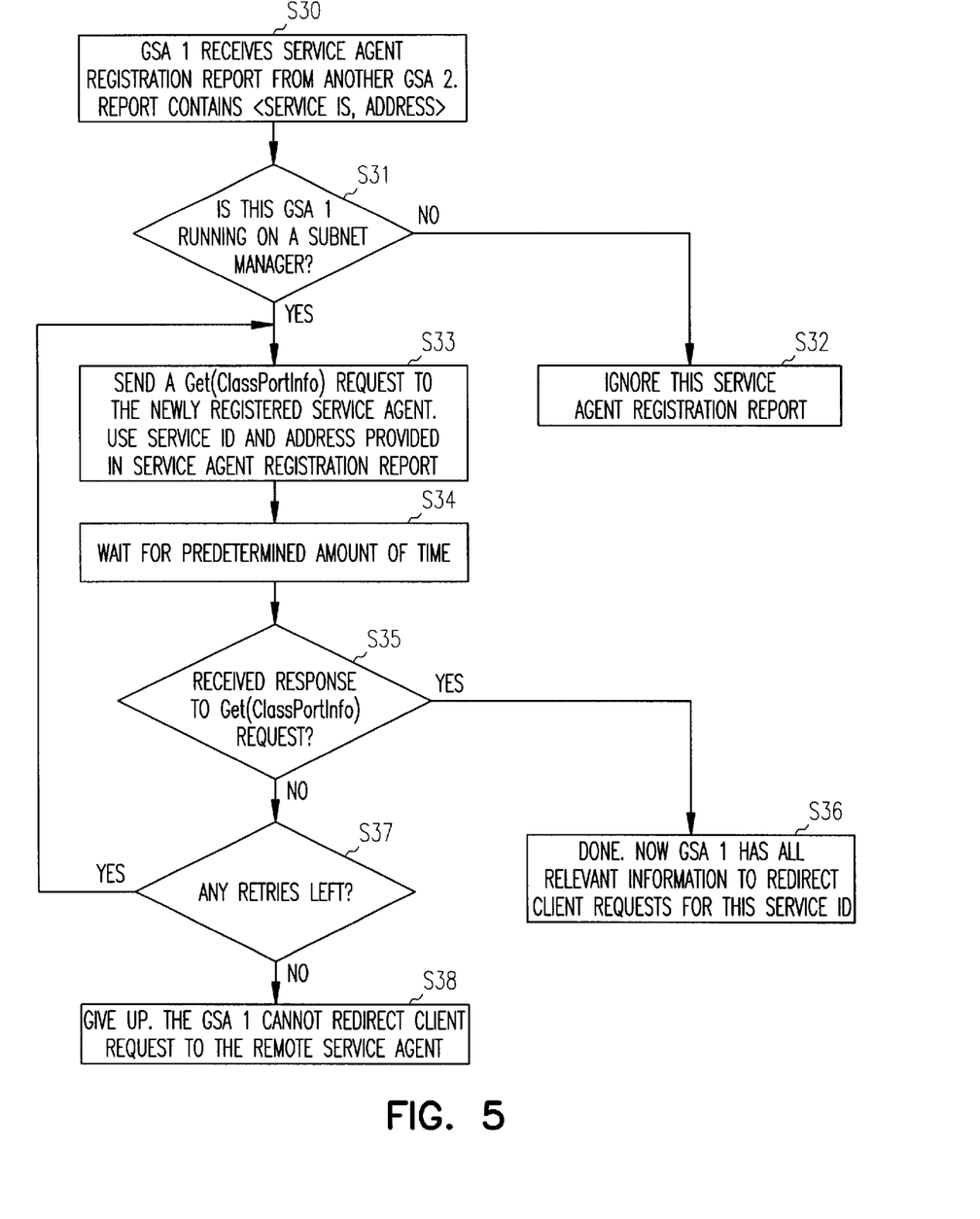
FIG. 5 is a flowchart of an example process that executes on a GSA for receiving a service agent registration report according to an example embodiment of the present invention.

FIG. 5 shows a flowchart of an example process that executes on a GSA for receiving a service agent registration report according to an example embodiment of the present invention. GSA 1 receives a service agent registration report from another GSA 2, S30. The report may contain a service class ID, and address of the service agent. It is determined whether GSA 1 is running on a subnet manager S31. If GSA 1 is not running on a subnet manager, the service agent registration report is ignored S32 (since GSAs on non-subnet manager hosts cannot reroute requests). If GSA 1 is running on a subnet manager, a Get(ClassPortInfo) request is sent to the newly registered service agent S33. The service class ID and address that was provided in the service agent registration report is used. An amount of time elapses (that may be predetermined) S34. A determination is made whether a response to the Get(ClassPortInfo) request has been received S35. If a response has been received, processing is completed S36. Now GSA 1 has all the relevant information to redirect client requests to this service class ID (of remote service agent). However, if a response has not been received, a determination is made as to whether there are any retries left S37. If there are retries left, steps S33, S34 and S35 may be repeated. If there are no retries left, the GSA gives up S38. Therefore, the GSA on the subnet manager cannot redirect client requests to this remote service agent.

Figure 6:
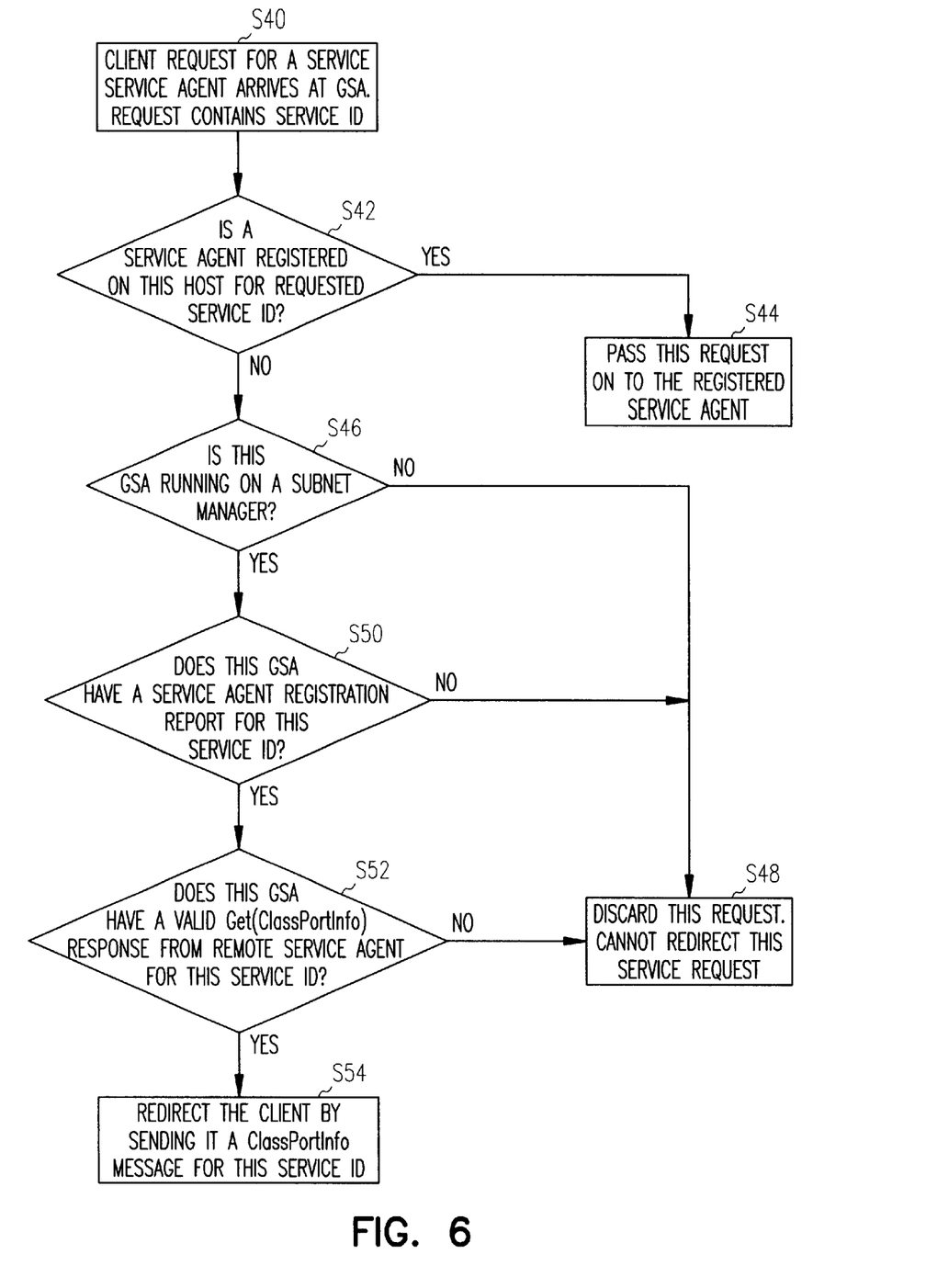
FIG. 6 is a flowchart of an example process that executes on a GSA when a client request targeted to a service agent arrives according to an example embodiment of the present invention.

FIG. 6 shows a flowchart of an example process that executes on a GSA for when a client request targeted to a service agent arrives according to an example embodiment of the present invention. A client request targeted to a service agent arrives at a GSA S40. The request may contain a service class ID. A determination is made as to whether a service agent is registered on this host for the requested service class ID S42. If there is a registered service agent on this host for this service class ID, the request is passed on to the registered service agent on the host S44. If the service class ID does not represent a service agent registered on this host, a determination is made as to whether this GSA is running on a subnet manager S46. If this GSA is not running on a subnet manager, the request is discarded S48. Therefore, this service request cannot be redirected. If this GSA is running on a subnet manager, a determination is made whether this GSA has a service agent registration report for this service class ID, S50. If there is no service agent registration report for this service class ID, the request is discarded S48. Therefore, this service request cannot be redirected. If there is a service agent registration report for this service class ID, it is determined whether this GSA has a valid Get(ClassPortInfo) response from the remote service agent for this service class ID, S52. If there is no valid response, this request is discarded. If there is a valid response, the client is redirected by sending the client a ClassPortInfo message for this service class ID, S54.

The present invention has several advantages. According to the present invention, service agents may be installed on any arbitrary host and can be made visible to all potential clients. Further, the node running the subnet manager is not overloaded, therefore, making the subnet manager node more reliable since the subnet manager is required to do less work. Moreover, according to the present invention, there is no need to manually reinstall a service agent on a new subnet manager. This would apply if the primary subnet manager were to become faulty, and a secondary subnet manager replaces the primary subnet manager.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for accessing service agents on non-subnet manager hosts in an Infiniband subnet comprising:
   registering, by a service agent at a first host, with a first General Service Agent (GSA) at the first host;
   sending the registration to a second GSA at a second host if the first host is not a subnet manager, the second host being a subnet manager;
   sending, by the second host, a request for access/identification information to the service agent;
   receiving the requested access/identification information at the second host;
   receiving, at the second host, a service request for the service agent at the first host, the service request being from a client;
   redirecting the client to the first host, the redirecting performed by the second host sending the client a message; and
   sending the service request for the service agent to the first host by the client, wherein the first host, second host, and client are part of an Infiniband subnet.

2. The method according to claim 1, wherein the request for access/identification information comprises a Get (ClassPortInfo) request.

3. The method according to claim 1, further comprising receiving the requested access/identification information at the second GSA.

4. The method according to claim 1, further comprising sending, by the second host, the request for access/identification information to the first GSA, the first GSA forwarding the request for access/identification information to the service agent.

5. The method according to claim 4, further comprising sending, by the second GSA, the request for access/identification information to the first GSA.

6. The method according to claim 1, wherein the client resides at one of the first host, the second host and a third host that is part of the Infiniband subnet.

7. The method according to claim 1, wherein the message comprises at least some of the access/identification information.

8. The method according to claim 1, wherein the received requested access/identification information comprises at least one of a service agent address, a service class I.D., and a service agent queue pair.

9. The method according to claim 8, further comprising storing the received requested access/identification information by the second GSA.

10. The method according to claim 8, further comprising comparing the service class I.D. with a second service class I.D. received in the service request.

11. The method according to claim 1, wherein the message comprises a Get(ClassPortInfo) message.

12. An Infiniband subnet system that provides access to service agents on nonsubnet manager hosts comprising:
    at least one device, the at least one device being part of an Infiniband subnet, at least one device including a subnet manager;
    at least one first host, the at least one first host being part of the Infiniband subnet, the at least one first host including a service agent, the service agent registering with the subnet manager;
    at least one second host, the at least one second host being part of the Infiniband subnet, the at least one second host including a client, the client sending a service request to the subnet manager for services from the service agent,
    wherein the service request is rerouted by the subnet manager to the at least one first host containing the service agent.

13. The system according to claim 12, wherein the at least one device comprises at least one of a host, a switch, and an I/O enclosure.

14. The system according to claim 12, further comprising at least one switch, the at least one switch interconnecting the at least one device, the at least one first host and the at least one second host in the Infiniband subnet.

15. An article comprising a storage medium having instructions stored therein, the instructions when executed causing a computing device to perform:
    receiving a service agent registration at the computing device from a service agent residing on the computing device;
    determining if the computing device is a subnet manager;
    sending the service agent registration to a subnet manager if the computing device is not a subnet manager;
    determining if an information request has been received by the computing device from the subnet manager; and
    resending the service agent registration to the subnet manager if an information request has not been received by the computing device from the subnet manager and retries remain,
    wherein the subnet manager can reroute service requests for the service agent if at least one of the computing device is a subnet manager and an information request has been received by the computing device from the subnet manager.

16. The article according to claim 15, wherein the information request comprises a Get(ClassPortInfo) request.

17. The article according to claim 15, wherein the service agent registration comprises at least one of a service agent service class ID and a service agent address.

18. An article comprising a storage medium having instructions stored therein, the instructions when executed causing a computing device to perform:
    receiving a service agent registration at the computing device from a service agent residing on a second computing device;
    determining if the computing device is a subnet manager;
    sending an information request to the service agent if the computing device is a subnet manager;
    determining if a response to the information request has been received by the computing device from the service agent; and resending the information request to the service agent if a response to the information request has not been received by the computing device from the service agent and retries remain, wherein the subnet manager can reroute service requests for the service agent if at least one of the computing device is a subnet manager and a response to the information request has been received by the computing device from the service agent.

19. The article according to claim 18, wherein the information request comprises a Get(ClassPortInfo) request.

20. The article according to claim 18, wherein the service agent registration comprises at least one of a service agent service class ID and a service agent address.

21. An article comprising a storage medium having instructions stored therein, the instructions when executed causing a computing device to perform:

receiving a client service request at the computing device, the client service request being for a service agent;

determining if the service agent is registered and resides on the computing device, and sending the client service request to the service agent if the service agent is registered and resides on the computing device;

determining if the computing device is a subnet manager if the service agent is not registered and residing on the computing device;

determining if the service agent is registered on the computing device if the computing device is a subnet manager;

determining if a valid response has been received by the computing device from the service agent if the service agent is registered on the computing device and the computing device is a subnet manager; and redirecting the client to the service agent by sending the client a redirect message if a valid response has been received by the computing device from the service agent.

22. The article according to claim 21, wherein the client service request comprises a service class ID.

23. The article according to claim 21, wherein the valid response comprises a Get(ClassPortInfo) response.

24. The article according to claim 21, wherein the redirect message comprises a Get(ClassPortInfo) message.

25. A method comprising:

receiving on a computing device a service agent registration report from a host;

determining that the computing device is a subnet manager prior to requesting access information from the host; and, if the computing device is a subnet manager:
  requesting access information from the host;
  receiving the access information; and
  storing the access information; and if the computing device is not a subnet manager, forwarding the service agent registration report to the subnet manager.

26. The method of claim 25, wherein the access information comprises one or more of the following:

host address;

queue pair; and service class I.D. (identifier).

27. The method of claim 25, wherein said forwarding the service agent registration report to the subnet manager additionally comprises forwarding the service agent registration report if additional retries remain.

28. A method comprising:

receiving a service request from a remote service agent on a client, the service request including a service class I.D. (identifier);

determining if access information corresponding to a service agent for the service class I.D. exists on the computing device; and if the service class I.D. exists on the computing device, redirecting the client by sending the client a redirection response that includes information needed for the client to be able to communicate with the remote service agent.

29. The method of claim 28, wherein said determining if access information corresponding to a service agent for the service class I.D. exists on the computing device comprises sending periodic Get(ClassPortInfo) messages to the remote service agent to make sure that the service agent is still alive.

30. The method of claim 28, wherein said determining if access information corresponding to a service agent for the service class I.D. exists on the computing device comprises sending a Get(ClassPortInfo) message to the remote service agent upon receipt of a service request from a remote service agent of a client.

* * * * *